United States Patent [19]

Van Broekhoven et al.

[11] Patent Number: 5,155,208

[45] Date of Patent: Oct. 13, 1992

[54] CATALYTIC POLYMERIZATION OF CO/OLEFIN WITH LOW BOILING DILUENT AND H$_2$ PARTIAL PRESSURE

[75] Inventors: Johannes A. Van Broekhoven; Wiebren A. Miedema, both of Amsterdam, Netherlands

[73] Assignee: Shell Oil Company, Houston, Tex.

[21] Appl. No.: 695,669

[22] Filed: May 6, 1991

[30] Foreign Application Priority Data

Jun. 1, 1990 [NL] Netherlands ............ 9001255

[51] Int. Cl.$^5$ ............................................ C08G 67/02
[52] U.S. Cl. .................................................. 528/392
[58] Field of Search ........................................ 528/392

[56] References Cited

U.S. PATENT DOCUMENTS

| | | | |
|---|---|---|---|
| 3,694,412 | 1/1950 | Brubaker | 260/63 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,877,860 | 10/1989 | Van Broekhoven et al. | 528/392 |
| 4,880,903 | 11/1989 | Van Broekhoven et al. | 528/392 |
| 4,940,774 | 7/1990 | Wong | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |
| 673284 | 3/1987 | Switzerland . |
| 673656 | 3/1987 | Switzerland . |
| 1081304 | 8/1967 | United Kingdom . |

*Primary Examiner*—Harold D. Anderson

[57] ABSTRACT

An improved process for the production of linear alternating polymers of carbon monoxide and at least one ethylenically unsaturated hydrocarbon comprises contacting the carbon monoxide and hydrocarbon under polymerization conditions in the presence of a catalyst composition formed from a compound of palladium, a strong non-hydrohalogenic acid and a bidentate ligand of phosphorus and in the presence of a relatively low boiling aprotic reaction diluent and molecular hydrogen.

16 Claims, No Drawings

CATALYTIC POLYMERIZATION OF CO/OLEFIN WITH LOW BOILING DILUENT AND H₂ PARTIAL PRESSURE

FIELD OF THE INVENTION

This invention relates to an improved process for the production of linear alternating polymers of carbon monoxide and at least one ethylenically unsaturated hydrocarbon. More particularly, the invention relates to such a process conducted in the presence of an aprotic reaction diluent and molecular hydrogen.

BACKGROUND OF THE INVENTION

The class of linear alternating polymers of carbon monoxide and at least one ethylenically unsaturated hydrocarbon has been known for some time. Nozaki, e.g., U.S. Pat. No. 3,694,412, produced such polymers in the presence of arylphosphine complexes of palladium moieties and certain inert solvents. More recent processes for the production of the linear alternating polymers, now known as polyketones or polyketone polymers, are illustrated by a number of published European Patent Applications including Nos. 121,965, 181,014, 213,671 and 257,663. These processes generally involve contacting the reactants under polymerization conditions in the presence of a reaction diluent and a catalyst composition formed from a compound of palladium, cobalt or nickel, the anion of a strong non-hydrohalogenic acid and a bidentate ligand of phosphouus, arsenic, antimony or nitrogen.

The polyketones are relatively high molecular weight materials having established utility as premium thermoplastics. The polyketone polymers are processed by methods conventional for thermoplastics, e.g., injection molding, extrusion or thermoforming, into a variety of shaped articles such as containers for food or drink.

The scope of the polymerization process is extensive, but without wishing to be limited, a preferred process employs an alkanol reaction diluent, particularly methanol, and a catalyst composition formed from a compound of palladium, the anion of a non-hydrohalogenic acid having a pKa below 2 and a bidentate ligand of phosphorus. The choice of the individual precursors of the catalyst composition has a considerable impact upon the polymerization process, as does the choice of the reaction environment, a term usually referring to the materials present in the reaction mixture in addition to the reactants and catalyst composition components. In most cases, the reaction environment usually refers to the reaction diluent. The polymer product is not often appreciably soluble in the reaction diluent and is observed as a slurry in the diluent. It is in part because of the observation of a "slurry of product" that batch or semi-continuous processes for polyketone production are referred to as slurry-phase processes.

The choice of reaction diluent also has a substantial effect on the polymerization process and in particular upon the polymerization rate. In many, if not most instances, a protic solvent provides faster reaction rates, particularly when lower alkanols such as methanol are used as the reaction diluent. However, the use of mixtures of aprotic solvents and alcohols is disclosed by van Broekhoven et al, U.S. Pat. No. 4,877,860, and the use of mixtures of aprotic solvents and water is shown by Wong, U.S. Pat. No. 4,940,774. A somewhat different reaction environment is exemplified by U.S. Pat. No. 4,835,250 (equivalent to EP 121,965) wherein a diethylene glycol and molecular hydrogen were employed. It would be of advantage, however, to provide an additional reaction environment for the production of linear alternating polymers of carbon monoxide and at least one ethylenically unsaturated hydrocarbon.

SUMMARY OF THE INVENTION

The present invention provides an improved process for the production of linear alternating polymers of carbon monoxide and at least one ethylenically unsaturated hydrocarbon. More particularly, the invention provides such an improved polymerization process which comprises contacting the monomeric reactants in the presence of a catalyst composition formed from a compound of palladium, an anion of a strong non-hydrohalogenic acid and a bidentate ligand of phosphorus, and in the presence of an aprotic solvent and molecular hydrogen.

DESCRIPTION OF THE INVENTION

The process of the invention comprises an improved process for the production of linear alternating polymers of carbon monoxide and at least one ethylenically unsaturated hydrocarbon. The ethylenically unsaturated hydrocarbons which are useful as polymer precursors have up to 20 carbon atoms inclusive, preferably up to 10 carbon atoms inclusive, and are aliphatic such as ethylene or other α-olefins including propylene, butylene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred copolymers produced according to the process of the invention are copolymers of carbon monoxide and ethylene and the preferred terpolymers are terpolymers of carbon monoxide, ethylene and a second hydrocarbon of at least 3 carbon atoms, particularly an α-olefin such as propylene.

When the preferred terpolymers are produced by the process of the invention, there will be at least about 2 units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymeric chain of the preferred polymers is therefore represented by the repeating formula $$\mathrm{+[CO+(CH_2-CH_2)]_x[CO+(G)]_y} \quad (I)$$

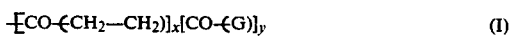

wherein G is the moiety of an ethylenically unsaturated hydrocarbon of at least 3 carbon atoms polymerized through the ethylenic unsaturation thereof and the ratio of y:x is no more than about 0.5. When the preferred copolymers are produced, there will be no second hydrocarbon present and the copolymers are represented by the above formula I wherein y is zero. When y is other than zero, i.e., terpolymers are produced, the —CO—(CH₂—CH₂)— units and the —CO—(G)— units will be found randomly throughout the polymer chain and preferred ratios of y:x are from about 0.01 to about 0.1. The end groups or "caps" of the polymer chain will depend upon what materials were present during polymerization and whether and how the polymer was purified. The precise nature of the end groups will have little significance so far as the overall properties of the polymer are concerned so that the polymers are fairly represented by the formula for the polymeric chain as depicted above.

Of particular interest are the polyketone polymers of number average molecular weight from about 1000 to about 200,000, particularly those polymers of number average molecular weight from about 20,000 to about 90,000, as determined by gel permeation chromatography. The properties of such polymers will depend in part upon the molecular weight, whether the polymer is a copolymer or a terpolymer and, in the case of terpolymers, the nature of and the proportion of the second hydrocarbon present. The polyketone polymers will typically have a melting point of from about 175° C. to about 300° C. although melting points from about 210° C. to about 270° C. are more frequently encountered. The polymers will have a limiting viscosity number (LVN), measured in a standard capillary viscosity measuring device in m-cresol at 60° C., of from about 0.4 dl/g to about 10 dl/g, more often from about 0.8 dl/g to about 4 dl/g.

The linear alternating polymers are produced by the general procedures of the above published European Patent Applications employing a catalyst composition formed from a compound of palladium, the anion of a non-hydrohalogenic acid having a pKa below 2 and a bidentate ligand of phosphorus. The compound of palladium is suitably a carboxylate, particularly an alkanoate, and palladium acetate, palladium propionate, palladium butyrate, palladium hexanoate and palladium octanoate are satisfactory. Preferred as the palladium compound is palladium acetate.

The non-hydrohalogenic acid whose anion is a catalyst composition precursor is an inorganic acid such as sulfuric acid or perchloric acid or is an organic acid including carboxylic acids such as trichloroacetic acid, dichloroacetic acid, trifluoroacetic acid or difluoroacetic acid as well as sulfonic acids such as methanesulfonic acid, trichloromethanesulfonic acid or p-toluenesulfonic acid. Preferred anions are derived from trifluoroacetic acid or p-toluenesulfonic acid, particularly trifluoroacetic acid. The anion is preferably provided as the free acid but alternatively is provided as a metal salt, particularly as a non-noble transition metal salt. However provided, the anion is employed in a quantity of from about 1 mole to about 100 moles per mole of palladium, preferably in a quantity from about 2 moles to about 50 moles per mole of palladium.

The bidentate ligand of phosphorus is a tetraaryl diphosphine wherein a divalent aliphatic group bridges the two phosphorus atoms and each phosphorus has two monovalent aromatic substituents. Suitable bidentate phosphine ligands are illustrated by the formula

wherein R independently is aromatic of up to 10 carbon atoms inclusive and R' is aliphatic of up to 10 carbon atoms inclusive with from 2 to 4 carbon atoms inclusive in the bridge between the phosphorus atoms. Preferred R' groups have up to 5 carbon atoms inclusive and are illustrated by 1,2-ethylene, 1,3-propylene, 1,2-propylene, 2,2-dimethyl-1,3-propylene and 1,3-butylene. Particularly preferred as the R' group is 1,3-propylene. The R group is hydrocarbyl containing only atoms of carbon and hydrogen or is substituted hydrocarbyl containing additional atoms in the form of polar aromatic ring substituents. Illustrative hydrocarbyl R groups include phenyl, naphthyl, tolyl and xylyl. Preferred R groups are substituted hydrocarbyl containing at least one polar substituent, preferably alkoxy, at least one of which is substituted on an aromatic ring carbon atom which is ortho to the ring carbon atom through which the R group is connected to the phosphorus. Illustrative of such R groups are 2-methoxyphenyl, 2-ethoxyphenyl, 2-methoxy-4-butoxyphenyl, 2,6-diethoxyphenyl, 2,4-dimethoxy-4-tolyl and 2,4,6-trimethoxyphenyl. Particularly preferred as the R group is 2-methoxy and the most preferred bidentate phosphine ligand is 1,3-bis[di(2-methoxyphenyl)phosphino]propane. The quantity of bidentate ligand to be employed is from about 0.5 mole to about 2 moles of ligand per mole of palladium. Preferably, there will be from about 0.75 mole to about 1.5 mole of phosphine ligand per mole of palladium.

The polymerization process is conducted by contacting the carbon monoxide and hydrocarbon reactants under polymerization conditions in the presence of the catalyst composition, the aprotic reaction diluent and molecular hydrogen. The molar ratio of carbon monoxide to total ethylenically unsaturated hydrocarbon is from about 10:1 to about 1:10 although preferred molar ratios are from about 5:1 to about 1:5. The catalyst composition is produced by mixing the components thereof. The mixing is suitably accomplished prior to providing the composition to the reactor or alternatively the catalyst composition is formed in situ in the reactor. However provided, the catalyst composition is employed in a sufficient quantity to provide from about $1 \times 10^{-7}$ mole to about $1 \times 10^{-3}$ mole of palladium per mole of total ethylenically unsaturated hydrocarbon. Preferred amounts of catalyst composition provide from about $1 \times 10^{-6}$ mole to about $1 \times 10^{-4}$ mole of palladium per mole of total unsaturated hydrocarbon. The polymerization conditions will typically include a reaction temperature from about 25° C. to about 150° C., preferably from about 30° C. to about 130° C. Suitable reaction pressures are from about 2 bar to about 150 bar although pressures from about 5 bar to about 100 bar are more frequently employed.

The advantages of the present invention are enjoyed when the reaction diluent is an aprotic reaction diluent, particularly a relatively low boiling reaction diluent, i.e., a diluent with a normal boiling point below about 125° C., and the reaction is conducted in the presence of molecular hydrogen. Illustrative aprotic reaction solvents have up to 6 carbon atoms and include lower alkanones such as acetone and methyl ethyl ketone, aliphatic carboxylic acid esters such as methyl acetate, ethyl acetate and methyl propionate, and cyclic ethers such as tetrahydrofuran and dioxane. The preferred aprotic reaction diluents are tetrahydrofuran and methyl ethyl ketone.

The quantity of hydrogen to be utilized will in part depend upon the size of the reactor and the polymerization conditions employed. It is convenient to measure the hydrogen in terms of the partial pressure of the hydrogen present at polymerization conditions. The polymerization process of the invention is conducted at a hydrogen pressure of from about 1 bar to about 50 bar, preferably a pressure from about 3 bar to about 25 bar. The use of the relatively low boiling aprotic reaction diluent and molecular hydrogen provides faster reaction rates than when an aprotic reaction diluent is employed in the absence of molecular hydrogen. This contrasts with the situation where molecular hydrogen is employed with a protic solvent where the presence of molecular hydrogen has little or no effect upon the polymerization rate.

The polyketone products of the process of the invention are thermoplastic polymers of established utility. They are processed by techniques conventional for thermoplastics into shaped articles such as containers for food and drink and parts and housings for automotive applications.

The invention is further illustrated by the following Comparative Examples (not of the invention) and the following Illustrative Embodiments which should not be regarded as limiting. In the Comparative Examples and Illustrative Embodiments the carbon monoxide/ethylene copolymers produced were shown by NMR analysis to be linear alternating polymers.

COMPARATIVE EXAMPLE I

A copolymer of carbon monoxide and ethylene was produced by charging 600 ml of methyl ethyl ketone to an autoclave of 1.25 liter capacity equipped with a mechanical stirrer. After the autoclave and contents were heated to 90° C., carbon monoxide was introduced to give a pressure of 11 bar and ethylene was added to give an additional 38 bar pressure. A catalyst composition solution was then introduced which comprised 5 ml acetone, 10 mmol palladium acetate, 200 mmol trifluoroacetic acid and 10.5 mmol 1,3-bis[di(2-methoxyphenyl)phosphino]propane. The pressure in the autoclave was maintained by continuous introduction of an equimolar mixture of carbon monoxide and ethylene. After 18 hours the reaction was terminated by cooling the autoclave and contents to room temperature and releasing the pressure. The copolymer was recovered from the product mixture by filtration, washed with methyl ethyl ketone and dried. The yield of copolymer was 65 g, produced at a calculated rate of 0.4 kg of copolymer/g Pd hr.

ILLUSTRATIVE EMBODIMENT I

A copolymer of carbon monoxide and ethylene was produced by a process substantially similar to that of Comparative Example I except that
a) the ethylene added gave a pressure of 34 bar rather than 38 bar and hydrogen was added to give an additional pressure of 5 bar,
b) the catalyst composition solution comprised 2 ml acetone, 5 mmol palladium acetate, 100 mmol trifluoroacetic acid and 5.25 mmol 1,3-bis[di(2-methoxyphenyl)phosphino]propane, and
c) the reaction time was 7 hours instead of 18 hours.

The yield of copolymer was 98.7 g, produced at the rate of 2.8 kg of copolymer/g Pd hr.

COMPARATIVE EXAMPLE II

A carbon monoxide/ethylene copolymer was produced by a procedure substantially similar to that of Comparative Example I except that 600 ml of tetrahydofuran was introduced into the autoclave instead of methyl ethyl ketone, the reaction time was 20 hours instead of 18 hours and the copolymer was washed with tetrahydrofuran instead of methyl ethyl ketone.

The yield of copolymer was 40 g, produced at the rate of 0.2 kg of copolymer/g Pd hr.

ILLUSTRATIVE EMBODIMENT II

A copolymer of carbon monoxide and ethylene was produced by a procedure substantially similar to that of Illustrative Embodiment I except that 600 ml tetrahydrofuran was introduced into the reactor instead of methyl ethyl ketone, the reaction time was 10 hours instead of 7 hours and the copolymer was washed with tetrahydrofuran instead of methyl ethyl ketone.

The yield of copolymer was 100 g, produced at a rate of 2 kg of copolymer/g Pd hr.

ILLUSTRATIVE EMBODIMENT III

When a procedure substantially similar to that of Illustrative Embodiment II is used to prepare a linear alternating polymer of carbon monoxide, ethylene and propylene, the reaction mixture additionally containing propylene, the terpolymer is obtained in satisfactory yield at an acceptable polymerization rate.

What is claimed is:

1. In the process of producing a linear alternating polymer of carbon monoxide and at least one ethylenically unsaturated hydrocarbon by contacting the carbon monoxide and hydrocarbon under polymerization conditions in the presence of a reaction diluent and a catalyst composition formed from a compound of palladium, the anion of a strong non-hydrohalogenic acid and a bidentate ligand of phosphorus, the improvement wherein the diluent is a relatively low boiling aprotic reaction diluent and the polymerization is conducted in the additional presence of a partial pressure of hydrogen of from about 1 bar to about 50 bar.

2. The process of claim 1 wherein the aprotic reaction diluent has a boiling point below 125° C.

3. The process of claim 2 wherein the aprotic reaction diluent is lower alkanone, aliphatic carboxylic acid ester or cyclic ether.

4. The process of claim 3 wherein the partial pressure of hydrogen is from about 3 bar to about 25 bar.

5. The process of claim 4 wherein the aprotic reaction diluent is methyl ethyl ketone.

6. The process of claim 4 wherein the aprotic reaction diluent is tetrahydrofuran.

7. In the process of producing linear alternating copolymer of carbon monoxide and ethylene by contacting carbon monoxide and ethylene under polymerization conditions in the presence of a reaction diluent and a catalyst composition formed from palladium acetate, the anion of trifluoroacetic acid or p-toluenesulfonic acid and 1,3-bis[di(2-methoxyphenyl)phosphino]propane, the improvement wherein the reaction diluent is an aprotic reaction diluent having a boiling point below 125° C. and the polymerization is conducted in the additional presence of a partial pressure of hydrogen of from about 1 bar to about 50 bar.

8. The process of claim 7 wherein the aprotic reaction diluent is lower alkanone, aliphatic carboxylic acid ester or cyclic ether.

9. The process of claim 8 wherein the partial pressure of hydrogen is from about 3 bar to about 25 bar.

10. The process of claim 9 wherein the aprotic reaction diluent is methyl ethyl ketone.

11. The process of claim 9 wherein the aprotic reaction diluent is tetrahydrofuran.

12. In the process of producing a linear alternating terpolymer of carbon monoxide, ethylene and propylene by contacting the carbon monoxide, ethylene and propylene under polymerization conditions in the presence of a reaction diluent and a catalyst composition formed from palladium acetate, the anion of trifluoroacetic acid or p-toluenesulfonic acid and 1,3-bis[di(2-methoxyphenyl)phosphino]propane, the improvement wherein the reaction diluent is an aprotic reaction diluent having a boiling point below 125° C. and the polymerization is conducted in the additional presence of a partial pressure of hydrogen from about 1 bar to about 50 bar.

13. The process of claim 12 wherein the aprotic reaction diluent is lower alkanone, aliphatic carboxylic acid ester or cyclic ether.

14. The process of claim 13 wherein the partial pressure of hydrogen is from about 3 bar to about 25 bar.

15. The process of claim 14 wherein the aprotic reaction diluent is tetrahydrofuran.

16. The process of claim 14 wherein the aprotic reaction diluent is methyl ethyl ketone.

* * * * *